Figure 1:
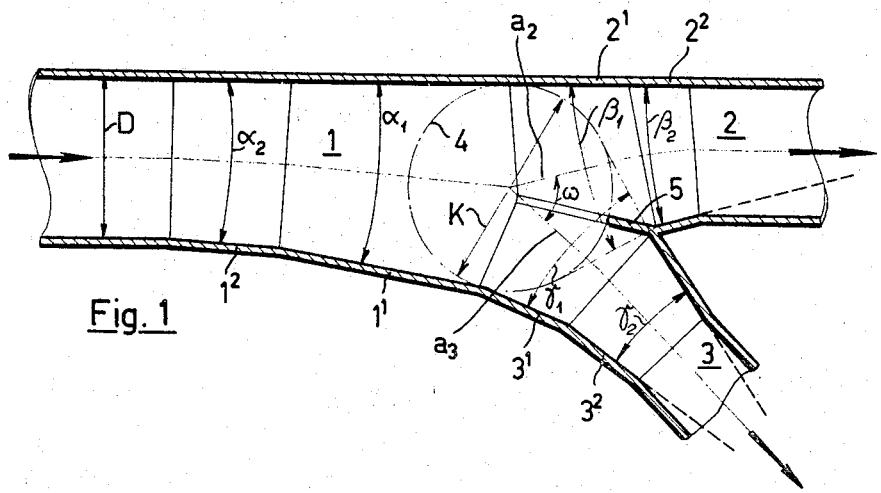

April 9, 1968 G. DOLDER ETAL 3,376,897
PIPE BRANCH PIECE
Original Filed June 6, 1963

INVENTORS
GUIDO DOLDER
NOEL MEYSTRE
BY
Dodge ʻʻʻʻʻʻ
Attorneys

UNITED STATES PATENT OFFICE

3,376,897
PIPE BRANCH PIECE
Guido Dolder and Noel Meystre, Zurich, Switzerland, assignors to Escher Wyss Aktiengesellschaft, Zurich, Switzerland, a corporation of Switzerland
Continuation of application Ser. No. 286,089, June 6, 1963. This application July 31, 1967, Ser. No. 657,420
9 Claims. (Cl. 138—39)

This application is a continuation of Ser. No. 286,089, filed June 6, 1963, now abandoned.

This invention relates to a pipe branch piece of a pressure line of, for example, a hydraulic power plant, having one pipe leg of large diameter and at least two pipe legs of smaller diameter, the adjoining pipe elements of the pipe legs touching a common imaginary sphere and widening toward the imaginary sphere. Such a pipe branch piece may serve as manifold or distributor piece, the flowing medium entering through the pipe leg of large diameter and leaving through the pipe legs of small diameter, or also as collector piece with the reverse direction of flow.

Said widening of the pipe leg of large diameter is known only for a distributor piece. Heretofore, however, only a relatively small widening of the inlet pipe leg has been provided, in view of the loss of total pressure in the flowing medium occurring in this inlet pipe in consequence of the widening.

It is also known in such pipe distributor pieces to provide a reinforcing gusset located between the two pipe legs of smaller diameter and arranged within the pipe line.

It is the aim of the invention to provide a pipe branch piece of substantially reduced flow resistance with a very small expenditure of material. In a pipe branch piece of the kind hereinbefore described, this object is achieved according to the invention in that a reinforcing gusset situated within the branch piece is provided at the junction of the adjoining pipe elements of the pipe legs of smaller diameter, and that furthermore the diameter of the imaginary sphere is more than 1.15 times the diameter of the pipe line connected to the pipe leg of large diameter.

Constructional examples of the subject of the invention are represented in simplified manner in the drawing.

Figure 2:
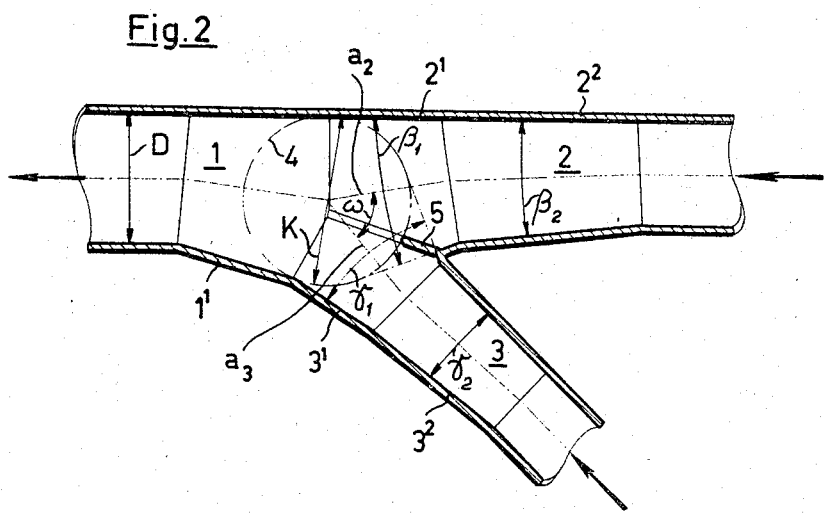

FIG. 1 shows a pipe distributor piece and FIG. 2 a pipe collector piece.

The pipe branch piece shown in FIG. 1 and serving as pipe distributor piece has as inlet a pipe leg 1 of large diameter and as outlets pipe legs 2 and 3 of smaller diameter. Adjoining pipe elements $1^1$, $2^1$, $3^1$ of the pipe legs 1, 2, 3 touch a common imaginary sphere 4 with diameter K, the pipe legs 1, 2, 3 widening toward the sphere. The axes $a_2$, $a_3$ of the adjoining pipe elements $2^1$, $3^1$ of the pipe legs 2, 3 of smaller diameter form an angle $\omega$ lying between 40° and 80°, for example 55°. At the junction of the adjoining pipe elements $2^1$ and $3^1$ a reinforcing gusset 5 is provided inside the branch piece. The diameter K of the imaginary sphere is greater than 1.15 times the diameter D of the main pipe connected to the pipe leg 1 of large diameter. Particularly favourable flow conditions are obtained if the diameter ratio K/D lies between 1.25 and 1.35.

The pipe leg 1 of large diameter consists of two conical pipe elements, namely the pipe element $1^1$ and a pipe element $1^2$. The conical pipe elements $1^1$, $1^2$ have aperture angles $\alpha_1$ and $\alpha_2$, respectively of different values, the conical pipe element $1^2$ first in the inflow direction having a smaller aperture angle $\alpha_2$ than the conical pipe element $1^1$ following in the inflow direction. The aperture angle $\alpha_2$ of the pipe element $1^2$ is preferably not greater than 5°, for example 3.5°, and the aperture angle $\alpha_1$ of the pipe element $1^1$ is preferably at least 8° and at the most 15°, for example 10°.

For pipe distributor pieces, in which the pipe leg 1 of large diameter is to serve as inlet and the pipe legs 2, 3 of smaller diameter are to serve as outlets, the angle $\omega$ formed by the axes $a_2$, $a_3$ of the adjoining pipe elements $2^1$, $3^1$ should advantageously be between 50° and 80°. A particularly favourable result is obtained when the axes $a_2$, $a_3$ form an angle $\omega$ of between 50° and 70°, and at the same time the pipe elements $2^1$, $3^1$ in the outlet direction narrow with an aperture angle $\beta_1$ and $\gamma_1$ respectively of more than 20°. In the pipe branch piece shown in FIG. 1 the aperture angle $\beta_1$ of the pipe element $2^1$ is 28° and the aperture angle $\gamma_1$ of the pipe element $3^1$ is greater than 35°, namely 38°. Following these pipe elements $2^1$, $3^1$ with aperture angles of more than 20° and more than 35°, respectively, in the outflow direction are pipe elements $2^2$, $3^2$ with a smaller aperture angle than 20° or 35°, respectively.

The aperture angles $\beta_1$, $\gamma_1$ of the adjoining pipe elements $2^1$, $3^1$ are selected so that for the pipe leg 3 the flow cross-sections at right-angles to the axes $a_3$ and bounded partly by the pipe element wall and partly by the plane of the reinforcing gusset 4, diminish in the direction of flow.

All these steps result in such a considerable improvement in the flow conditions compared with the values occurring in the known pipe branch pieces that, for example in a pressure line for 600 m. fall and connected distributor line with three such pipe branch pieces, a saving in pressure drop of more than 0.5 m. water column can be effected, even with different admission conditions of the turbines.

The favourable fundamental form of the pipe branch piece constructed in accordance with the invention is also effective when used as pipe collector piece, in which the pipe legs of smaller diameter serve as inlets and the pipe leg of large diameter as outlet.

The parts of the pipe collector piece shown in FIG. 2 carry the same reference numerals as the corresponding parts of the pipe distributor piece shown in FIG. 1.

In the pipe collector piece shown in FIG. 2, the two pipe legs 2 and 3 widen in the inflow direction. The pipe legs consist of two conical pipe elements $2^2$, $2^1$ and $3^2$, $3^1$, respectively with different aperture angles $\beta_1$, $\beta_2$ and $\gamma_1$, $\gamma_2$, respectively. The conical pipe element ($2^2$, $3^2$, respectively) preceding in the inflow direction has a smaller aperture angle $\beta_2$, $\gamma_2$, respectively than the conical pipe element ($2^1$, $3^1$ respectively) following in the inflow direction, the aperture angles $\beta_2$, $\gamma_2$, respectively of the first pipe elements $2^2$, $3^3$ in the inflow direction being preferably 10° at the most, for example 7°, while for the pipe elements $2^1$, $3^1$ touching the imaginary sphere 4, an aperture angle of preferably at least 20°, for example 35°, is provided.

In other respects, the pipe collector piece according to FIG. 2 has the same basic form as the pipe distributor piece according to FIG. 1, i.e. the axes $a_2$, $a_3$ of the adjoining pipe elements $2^1$, $3^1$ of the pipe legs 2, 3 of smaller diameter form an angle $\omega$ of 40° to 80°, at the junction of the pipe pieces $2^1$, $3^1$, a reinforcing gusset 5 is provided inside the branch piece, and the diameter K of the imaginary sphere is more than 1.15 times the diameter D of the main pipe connected to the pipe leg 1 of large diameter.

According to FIG. 1, each pipe leg 1, 2, 3 has two conical pipe elements $1^1$, $1^2$ and $2^1$, $2^2$ and $3^1$, $3^2$, respectively with aperture angles $\alpha_1$, $\alpha_2$; $\beta_1$, $\beta_2$ and $\gamma_1$, $\gamma_2$, respectively, differing from each other. Such an embodiment, in which each pipe leg has at least two conical pipe elements with different aperture angles is particularly advantageous if the pipe branch piece is to be used for both directions of flow, that is to say, if it is to act both as distributor piece and collector piece.

In the constructional examples shown, a generatrix of the pipe elements of the legs 1 and 2 lies on a straight line common to these pipe elements.

It must finally be remarked that the pipe legs 1, 2, 3 may consist of more than two conical pipe elements and that pipe branches with more than two pipe legs of smaller diameter may be constructed in the manner described.

We claim:

1. In combination a pressure line comprising a main pipe, at least two pipes of smaller diameter, and a branch piece consisting of a pipe leg of large diameter connected to said main pipe and at least two pipe legs of smaller diameter each connected to one of said pipes of smaller diameter, said pipe legs having adjoining pipe elements touching a common imaginary sphere and widening conically toward said imaginary sphere; said adjoining pipe element of said pipe leg of large diameter having an aperture angle of between 8° and 15°, said pipe leg of large diameter including a second pipe element widening conically toward said imaginary sphere, having an aperture angle of 5° at most, and interconnecting said adjoining pipe element and said main pipe; a reinforcing gusset provided in the interior of the pipe branch so as to extend along the junction line between the adjoining pipe elements of the pipe legs of smaller diameter; and said imaginary sphere having a diameter which is at least 1.15 times the diameter of the main pipe.

2. The combination defined in claim 1 in which the diameter of the imaginary sphere is between 1.15 times and 1.35 times the diameter of the main pipe.

3. The combination defined in claim 1 in which the axes of the adjoining pipe elements of the pipe legs of smaller diameter form an angle of at least 50° but at the most 80° between one another.

4. The combination defined in claim 3 in which the axes of the adjoining pipe elements of the pipe legs of smaller diameter form an angle of at the most 70° and in which the said adjoining pipe elements narrow in the outlet direction with an aperture angle of at least 20°.

5. The combination defined in claim 4 in which one of the adjoining pipe elements of the pipe legs of smaller diameter has an aperture angle of more than 35°.

6. In combination a pressure line comprising a main pipe and a branch piece consisting of a pipe leg of large diameter connected to said main pipe and at least two pipe legs of smaller diameter, said pipe legs having adjoining pipe elements touching a common imaginary sphere and widening conically toward said imaginary sphere, the pipe element in said large diameter pipe leg having an aperture angle of between 8° and 15°, said pipe legs each including a second pipe element interconnecting said adjoining elements and a corresponding pipe leg, said second pipe elements widening conically toward said sphere and having smaller aperture angles than the aperture angle of the corresponding pipe element; a reinforcing gusset provided in the interior of the pipe branch so as to extend along the junction line between the adjoining pipe elements of the pipe legs of smaller diameter; and said imaginary sphere having a diameter which is at least 1.15 times the diameter of the main pipe.

7. The combination defined in claim 6 in which the pipe legs of smaller diameter serve as inlets and the pipe leg of large diameter as outlet.

8. The combination defined in claim 7 in which the aperture angle of the first conical pipe element in the inflow direction is 10° at the most, and in which the aperture angle of the pipe element touching the imaginary sphere is at least 20°.

9. In combination a pressure line comprising a main pipe, at least two pipes of smaller diameter, and a branch piece consisting of an outlet pipe leg of large diameter connected to said main pipe and at least two inlet pipe legs of smaller diameter each connected to one of said pipes of smaller diameter, said pipe legs having adjoining pipe elements touching a common imaginary sphere and widening conically toward said imaginary sphere; said adjoining pipe elements of said pipe legs of smaller diameter having an aperture angle of at least 20°; said pipe legs of smaller diameter each including a second pipe element widening conically toward said imaginary sphere, having an aperture angle of 10° at the most, and interconnecting said adjoining pipe element and said pipe of small diameter; a reinforcing gusset provided in the interior of the pipe branch so as to extend along the junction line between the adjoining pipe elements of the pipe legs of smaller diameter; and said imaginary sphere having a diameter which is at least 1.15 times the diameter of said main pipe.

References Cited

German printed application 1,150,847, June 1963.
German printed application 1,192,891, May 1965.

LAVERNE D. GEIGER, *Primary Examiner.*

C. L. HOUCK, *Assistant Examiner.*